(No Model.)

S. G. SMITH.
SLOW CLOSING TANK VALVE.

No. 374,637. Patented Dec. 13, 1887.

Witnesses
Chas. F. Schmelz
Fred. B. Abbott

Inventor
Sanford G. Smith
By his Attorney
S. Scholfield

UNITED STATES PATENT OFFICE.

SANFORD G. SMITH, OF PROVIDENCE, RHODE ISLAND.

SLOW-CLOSING TANK-VALVE.

SPECIFICATION forming part of Letters Patent No. 374,637, dated December 13, 1887.

Application filed August 29, 1887. Serial No. 248,218. (No model.)

*To all whom it may concern:*

Be it known that I, SANFORD G. SMITH, a citizen of the United States, residing at Providence, in the State of Rhode Island, have invented a new and useful Improvement in Slow-Closing Tank-Valves, of which the following is a specification.

The nature of my invention consists in the improved construction and arrangement of the valve, whereby the water is prevented from interfering with its correct action, as hereinafter fully set forth.

Figure 1:
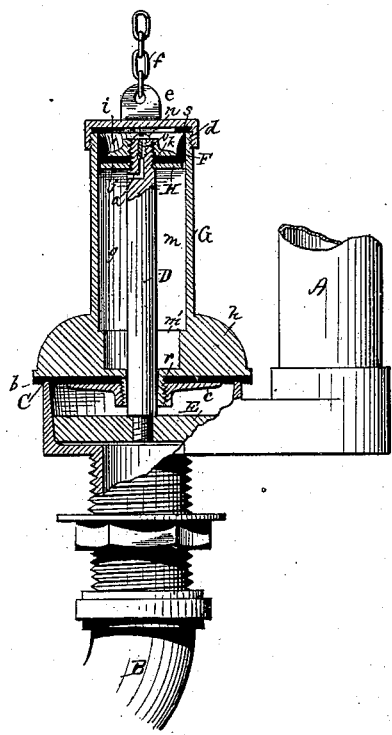
Figure 2:
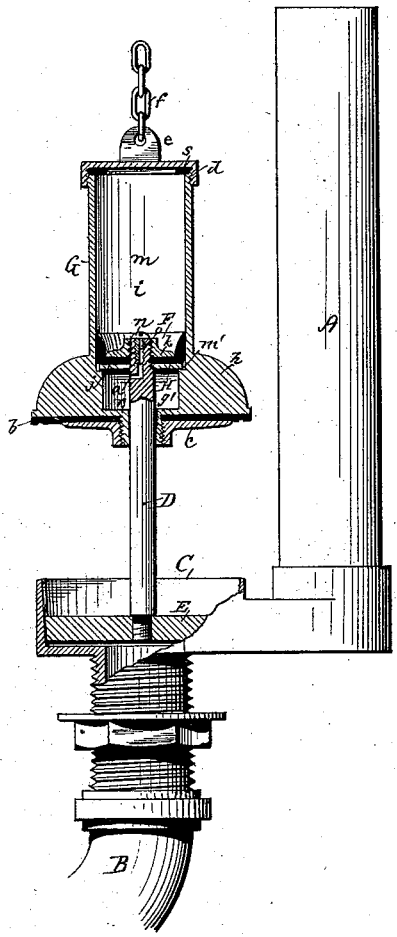
Figure 3:
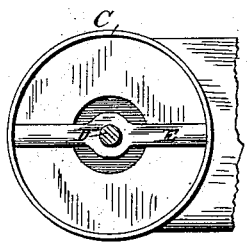

Figure 1 is a side elevation and partial section, showing my improved valve when in its closed condition. Fig. 2 is a similar view, showing the valve in its extreme raised position. Fig. 3 is a detail view, showing the supporting-bar for the valve-rod.

In the accompanying drawings, A is the overflow-pipe, through which the surplus water passes off from the tank.

B is the pipe leading from the tank to the water-closet seat.

C is an annular valve-seat, which is to be located at the lower portion of the water-tank.

The fixed valve-rod D is secured in an upright position from the supporting-bar E, and is provided at its upper end with the piston H, having an upwardly-turned packing-cup, F, which is held between the disk $j$ and the nut $k$, and with a vent-aperture, $a$. The hollow valve G slides upon the valve-rod D, and is provided at its face with the packing-disk $b$, which is held in position by means of the nut $c$, and at its upper end with the packing-ring $s$, and screw-cap $d$, provided with an ear, $e$, to which is secured the chain $f$, by means of which the valve G is to be raised from its seat C.

The valve G is provided with a cylindrical cavity, $m$, adapted to receive the packing-cup F and to form the opposite air-chambers, $g$ and $i$, the perforated head $r$ of the valve G being made to slide upon the valve-rod D. The valve G is also weighted at $h$ sufficiently to cause its downward movement upon the valve-rod by overcoming the friction of the packing-cup F. Whenever the valve G is raised by pulling upon the chain $f$, the water in the tank will flow under the valve and down through the pipe B, and upon the said upward movement of the valve the air in the chamber $g$ will be caused to pass from the said chamber past the upwardly-turned packing-cup into the chamber $i$ at the upper end of the valve, and then upon releasing the chain the valve G will slowly fall to its seat C upon the gradual escape of the air from the chamber $i$ back through the aperture $a$ into the chamber $g$. The valve will thus be supported from its seat for a considerable length of time, sufficient to allow the required amount of water to escape under the valve. The escape of air from the chamber $i$ into the chamber $g$ upon the downward closing movement of the valve may be readily regulated by means of a screw, $n$, having a groove, $o$, at one side for the passage of the air.

In order that the water which enters the lower portion of the chamber $g$ may not be carried past the cup-packing F at the closing upward movement of the valve, and thus injuriously affect the working of the valve, I provide a shoulder, $m'$, which, by striking against the under side of the disk $j$, will provide the chamber $g'$, Fig. 2, adapted to hold the water which enters the chamber $g$ along the side of the valve-stem. The stop-shoulder $m'$ may be made upon the valve-stem instead of the valve, if preferred, the requirement of the case being that the adjacent surfaces of the piston H and the head $r$ of the valve shall not be allowed to come together, so as to force the contained water past the cup-packing F.

I claim as my invention—

The combination, with the outlet-pipe B and valve-seat C, of the hollow valve G, provided with the perforated head $r$ and cap $d$, fixed valve-rod D, passing upward through the valve-opening and provided with the vent-aperture $a$, the piston H, provided with the upwardly-turned cup-packing F, and a stop-shoulder adapted to prevent the close contact of the perforated head $n$ of the valve with the inner face of the piston, substantially as and for the purpose specified.

SANFORD G. SMITH.

Witnesses:
SOCRATES SCHOLFIELD,
HARMON S. BABCOCK.